United States Patent [19]

Inoue

[11] Patent Number: 5,272,567
[45] Date of Patent: Dec. 21, 1993

[54] LENS BARREL HAVING REFERENCE SHAFTS MOVABLY SUPPORTING LENSES

[75] Inventor: Norikatsu Inoue, Tokyo, Japan

[73] Assignee: Sony Corporation, Japan

[21] Appl. No.: 777,200

[22] Filed: Oct. 16, 1991

[30] Foreign Application Priority Data

Oct. 23, 1990 [JP] Japan .................. 2-285386

[51] Int. Cl.$^5$ .................................. G02B 15/14
[52] U.S. Cl. .................. 359/696; 359/698; 359/824
[58] Field of Search .............. 359/694, 695, 696, 697, 359/698, 824, 825, 830, 823, 699, 700; 354/400, 195.12, 402

[56] References Cited

U.S. PATENT DOCUMENTS

| | | | |
|---|---|---|---|
| 4,534,624 | 8/1985 | Toda et al. | 359/696 |
| 4,583,827 | 4/1986 | Tokunaga et al. | 359/696 |
| 4,596,449 | 6/1986 | Iwata et al. | 359/696 |
| 4,865,433 | 9/1989 | Okajima et al. | 359/694 |
| 4,976,523 | 12/1990 | Ishikawa | 359/696 |

FOREIGN PATENT DOCUMENTS

| | | |
|---|---|---|
| 0361355 | 4/1990 | European Pat. Off. |
| 0443463 | 8/1991 | European Pat. Off. |
| 2917176 | 3/1980 | Fed. Rep. of Germany |

*Primary Examiner*—Loha Ben
*Attorney, Agent, or Firm*—Ronald P. Kananen

[57] ABSTRACT

A camera lens barrel having a housing which includes front and rear housing members. The lens barrel also includes driving power sources mounted within the lens barrel housing, and reference shafts which are supported in the lens barrel housing and extend parallel to an optical axis of the lens barrel. Further, a plurality of lens groups which include one group for zooming and another group for focusing, are mounted within the lens barrel housing. The lens groups for zooming and focusing are retained by separate lens holders which are mounted to the reference shafts so as to be reciprocally movable along the reference shafts upon activation of the driving power sources.

14 Claims, 5 Drawing Sheets

LENS BARREL HAVING REFERENCE SHAFTS MOVABLY SUPPORTING LENSES

BACKGROUND OF THE INVENTION

1. Field of the Invention

This invention relates to a lens barrel of an inner focusing type for use in a video camera. More particularly, this invention relates to a lens barrel having reference shafts for movably supporting lenses.

2. Description of the Background Art

Conventionally, there have been proposed various lens barrels for use in optical systems such as video cameras. Among such proposed lens barrels, a lens barrel of an inner focusing type is known in which a plurality of lens groups including a master lens group are adjustably moved along an optical axis thereof. FIG. 1 depicts such a conventional inner focusing lens barrel. Referring to FIG. 1, the lens barrel 100 has a cylindrical front housing member 101, an approximately annular iris block 102 and a cylindrical rear housing member 103, each of which is made of synthetic resin. A rear end portion of the front housing member 101 is connected by a screw 116 to a front end portion of the iris block 102. A rear end portion of the iris block 102 is connected by a screw 117 to a front end portion of the rear housing member 103. The front housing member 101 has a jaw 101a which extends radially inwardly from a periphery thereof so as to retain a lens group 104 used as a front lens. Furthermore, the iris block 102 retains a stationary lens group 105 in an inner periphery thereof.

A pair of guide shafts 106, 106 is supported between the front housing member 101 and the iris block 102 and extend parallel to an optical axis C. Similarly, another pair of guide shafts 107, 107 is supported between the iris block 102 and the rear housing member 103, extending parallel to the optical axis C.

The guide shafts 106, 106 pass through a first lens holder ring 109 such that the lens holder ring 109 is slidably supported thereon for axial slidable movement. The lens holder ring 109 retains a variator lens group 108 relative to the optical axis C which fulfills a variable zoom function. Further, the guide shafts 107, 107 pass through a second lens holder ring 111 such that the lens holder ring 111 is slidably supported thereon for axial slidable movement. The lens holder rings 111 retain a master lens group 110 which fulfills focusing, compensating and image-forming functions.

The first lens holder ring 109 is provided, on an outer periphery thereof, with a groove 109a acting as a cam follower. A projection 112a is engaged into the groove 109a and extends spirally along an inner surface of a cam drum 112 which is slidably rotated within the front housing member 101 by a stepping motor (not shown). The rotating movement of the cam drum 112 causes the lens holder ring 109 having the groove 109a to slide along the spiral projection 112a of the cam drum 112. Accordingly, the lens holder ring 109 reciprocally moves along the guide shafts 106, 106 so that the variator lens group 108 retained by the lens holder ring 109 moves reciprocally axially to and fro along the optical axis C.

The second lens holder ring 111 is supported through a support member 113 by a rotating shaft of a stepping motor 114 which projects forwardly from a housing body of the motor 114. The support member 113 is threadedly engaged with a lead screw 115 which is formed in a forward portion of the rotating shaft of the motor 114. When the motor 114 is actuated, the screw 115 rotates so that the support member 113 moves to and fro along the screw 115. Therefore, the second lens holder ring 111 held by the support member 113 reciprocally moves forward or backward along the guide shafts 107, 107 extending parallel to the optical axis C. To this end, the master lens group 110 retained by the lens holder ring 111 moves to and fro in a direction axially parallel to the optical axis C.

The iris block 102 further includes a plurality of diaphragm blades 119 which are operated via a rotating shaft 118a of a motor 118 so as to dilate or contract for adjusting an amount of light to the stationary lens group 105. In FIG. 1, numerals 120, 121 and 122 represent a low-pass filter, a charge coupled device (CCD) and a CCD substrate, respectively.

As described above, conventional lens barrels are divided into three parts, namely, the front housing member 101, the iris block 102 and the rear housing member 103. The respective parts formed of molded resin material are provided with socket and spigot joint sections, projections or pins which, upon assembly, serve for positioning of lenses in the lens barrel relative to the optical axis C. In order to limit positioning error to an allowable 15-20 $\mu$m, the parts must be manufactured to tolerances within a few microns. However, it is difficult to realize such small tolerances according to present molding techniques.

Further, conventionally, the guide shafts 106, 106 and 107, 107 for supporting the variator lens group and the master lens group 110 are separately secured within the front and rear housing members 101 and 103 of the lens barrel 100. Therefore, the lens group 104, 108, 105 and 110 retained in the lens barrel 100 may be decentered or inclined relative to the optical axis C during assembly of the lens barrel. Also, the total number of the parts of the lens barrel is large so that the lens barrel is complicated, with an enlarged structure.

Thus, such conventional lens barrels have been difficult to manufacture with sufficient precision while yet using a limited number of parts.

SUMMARY OF THE INVENTION

It is an object of the present invention to eliminate the aforementioned disadvantages and to provide a miniaturized lens barrel of a camera which is improved in accuracy and efficiency upon assembly.

In order to accomplish this object, there is provided a lens barrel of a camera having a lens barrel housing which includes front and rear housing members. The lens barrel further has driving power sources mounted within the lens barrel housing, and first and second reference shafts which are supported in the lens barrel housing and extend parallel to an optical axis of the lens barrel. Further, a plurality of lens groups which include one group for zooming and another group for focusing, are mounted within the lens barrel housing. The lens groups for zooming and focusing are retained by separate lens holders which are mounted to the reference shafts so as to be reciprocally movable along the reference shafts upon activation of the driving sources.

DETAILED DESCRIPTION OF THE PREFERRED EMBODIMENT

The preferred embodiment of a lens barrel of a video camera according to the present invention will now be described with reference to the accompanying drawings.

Figure 1:
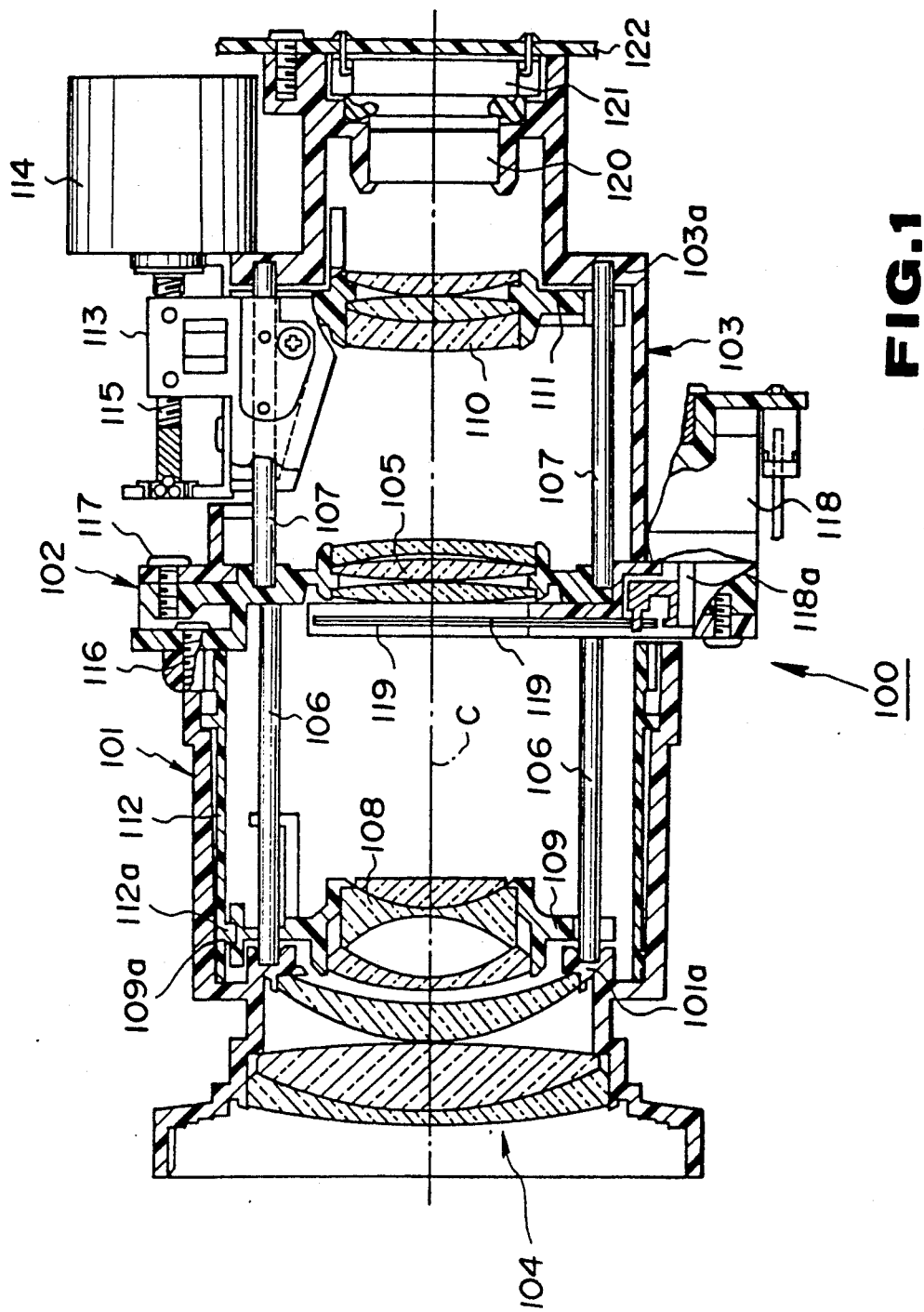
FIG. 1 is a sectional view of a conventional lens barrel.
Figure 2:
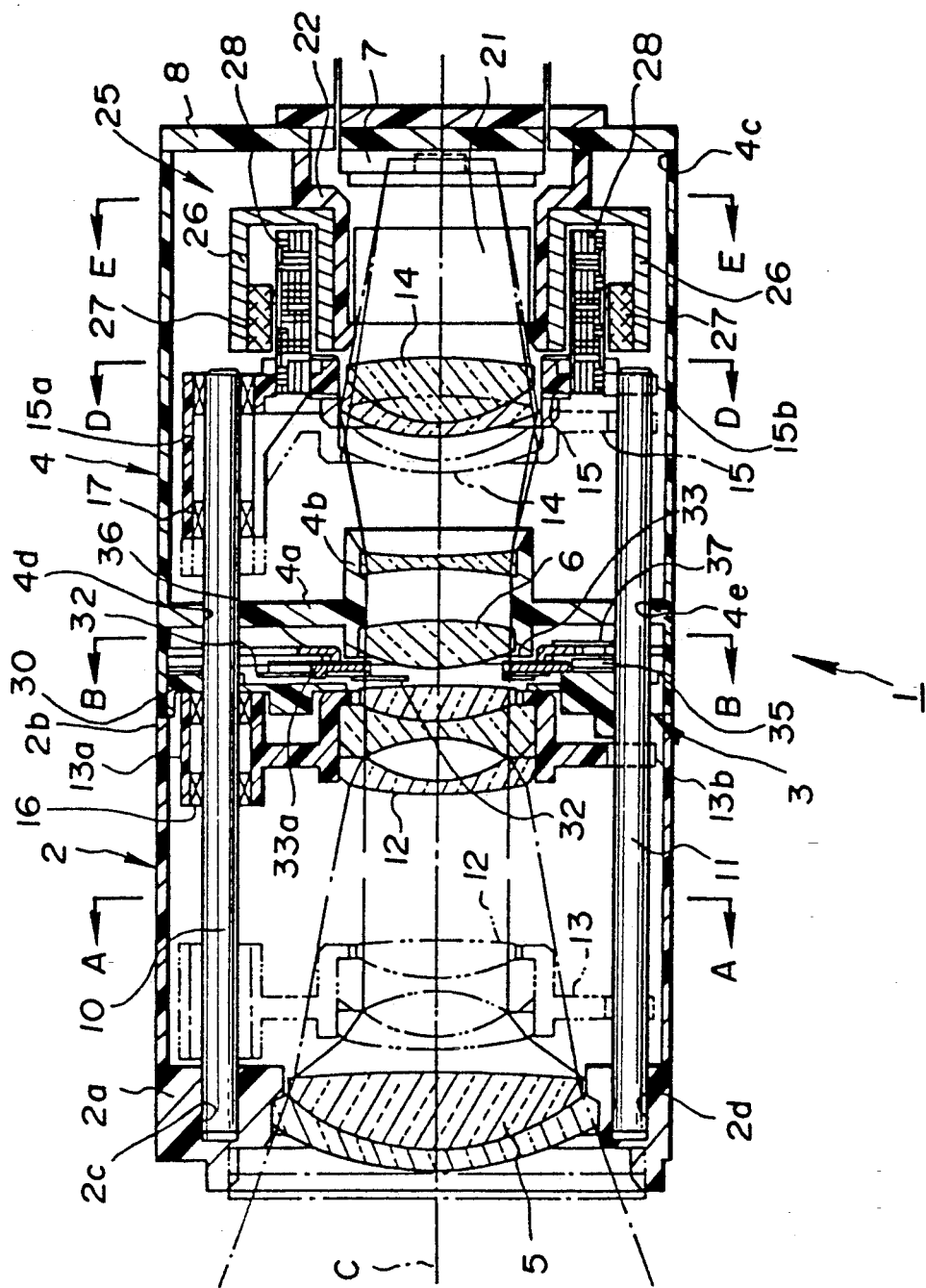
FIG. 2 is a sectional view of a lens barrel according to one embodiment of the present invention.
Figure 3:
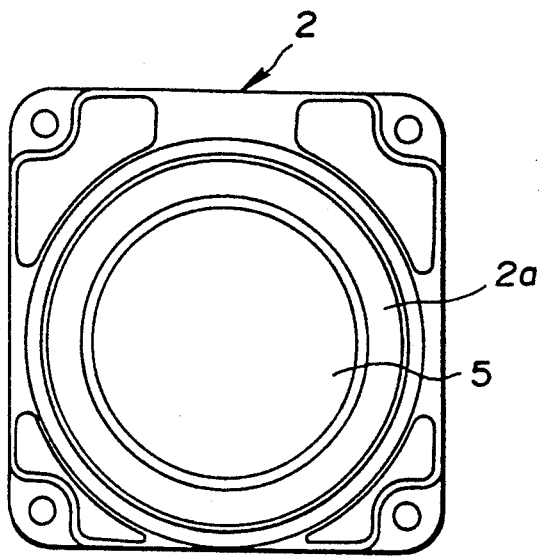
FIG. 3 is a plan view of the lens barrel shown in FIG. 2.
Figure 4:
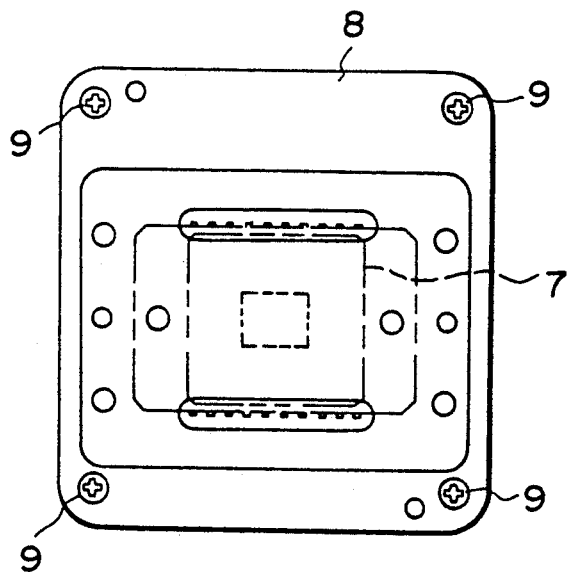
FIG. 4 is a rear view of the lens barrel shown in FIG. 2.

Referring to FIG. 2, a lens barrel 1 has a housing including square-tubular front and rear housing members 2 and 4 made of synthetic resin and a rectangular plate-like iris block 3 also made of synthetic resin The front housing member 2 has an opening 2b at a rear end thereof, to which the iris block 3 is fitted and fixed by screws (not shown). A rear portion of the iris block 3 is attached by screws (not shown) to a front end of the rear housing member 4. The front housing member 2 has a jaw 2a extending inwardly from a front end thereof to form an opening into which a lens group 5 is fitted. The rear housing member 4 has a jaw 4a which extends inwardly from a front side thereof. The jaw 4a is provided, at the center thereof, with a cylindrical portion 4b having an opening into which a stationary lens group 6 is fitted. The rear housing member 4 also has an opening 4c at a rear end thereof, to which a rectangular plate-like CCD block holder 8 retaining a charge coupled device (CCD) is fixed by screws 9.

The jaw 2a is provided, at upper and lower portions, with a pair of grooves 2c and 2d extending therein parallel to an optical axis C of the lens barrel. First and second reference shafts 10 and 11 are press-fit into the grooves 2c and 2d. The shafts 10, 11 are made of stainless steel subjected to hardening or the like and shaped into a round bar. The reference shafts 10 and 11 respectively extend parallel to the optical axis C through openings formed on the iris block 3 and openings 4d and 4e formed on the jaw 4a of the rear housing member 4 to an approximately middle portion of the rear housing member 4. The openings 4d and 4e function as a reference for positioning the rear housing member 4.

Figure 7:
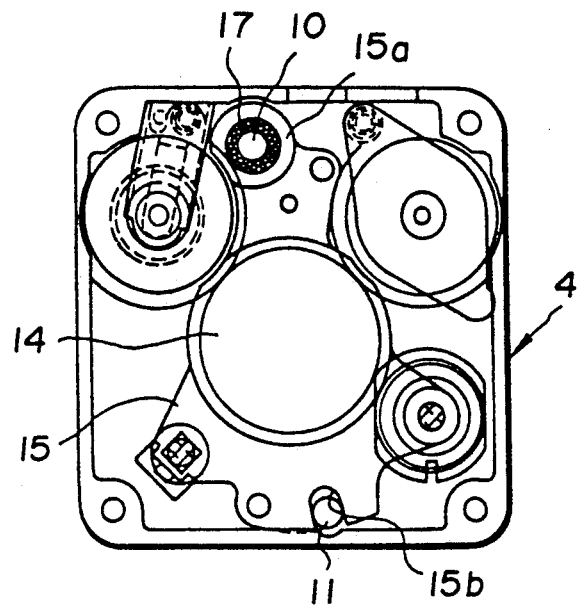
FIG. 7 is a sectional view of the lens barrel, taken along line D—D in FIG. 2.

The reference shafts 10 and 11 extending in the front housing member 2 pass through openings formed on upper and lower sides of an outer periphery of a first lens holder ring 13 retaining a variator lens group 12 for zooming. The lens holder ring 13 having the variator lens group 12 is slidably supported on the reference shafts 10 and 11. Similarly, as illustrated in FIGS. 2 and 7, the reference shafts 10 and 11 extending in the rear housing member 4 pass through openings formed on upper and lower sides of an outer periphery of second lens holder ring 15 retaining a master lens group 14 which fulfills focusing, compensation and image-forming functions. The lens holder ring 15 having the master lens group 14 for focusing is slidably supported on the reference shafts 10 and 11. The lens holder rings 13 and 15 are provided, at upper portions 13a and 15a thereof, with cylindrical bearings 16 and 17 which are press-fitted thereto and slidably supported on the reference shaft 10. Guide grooves 13b and 15b, into which the reference shaft 11 is fitted, are formed at lower portions of the lens holder rings 13 and 15. The reference shafts 10 and 11 not only function as a reference upon assembling the front and rear housing members 2 and 4 and the iris block 3, but also act as a slide guide for reciprocating movement of the first and second lens holder rings 13 and 15 along the optical axis C. Further, the reference shaft 11 functions as a common reference for positioning of the lens holder rings 13 and 15 and restrains rotational movement of the lens holder rings 13 and 15 around the reference shaft 10.

Figure 5:
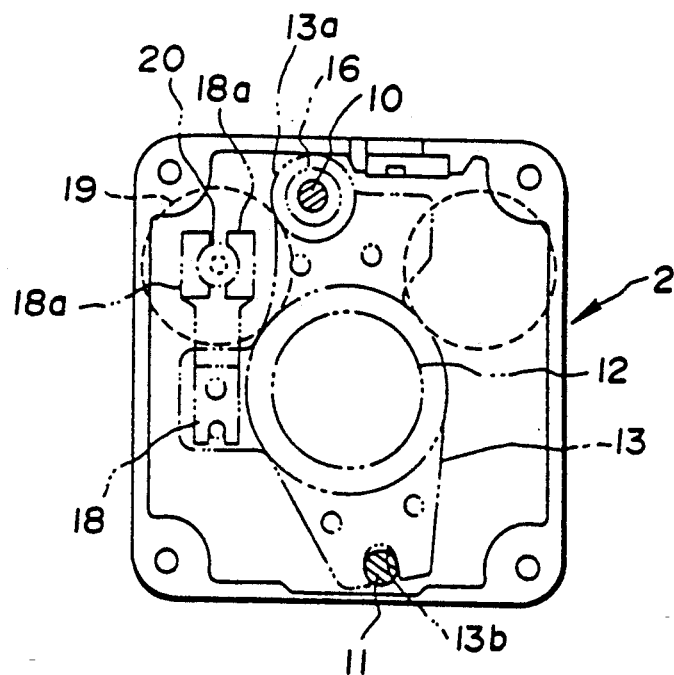
FIG. 5 is a sectional view of the lens barrel, taken along line A—A in FIG. 2.

As illustrated in FIG. 5, a support plate 18 is secured to a protruding portion extending from a periphery of a circular portion of the lens holder ring 13. The support plate 18 has a pair of threaded blocks 18a, 18a opposingly disposed at an end of the support plate 18. A lead screw 20 forming a rotating shaft of a stepping motor 19, projects from a front end of the stepping motor 19 and is screwed into an opening formed between the blocks 18a, 18a so that the lens holder ring 13 moves to and fro along the reference shafts 10 and 11 as the stepping motor 19 rotates. Accordingly, the variator lens group 12 retained by the lens holder ring 13 moves to and fro in the direction of the optical axis C so as to perform a power zoom.

Figure 8:
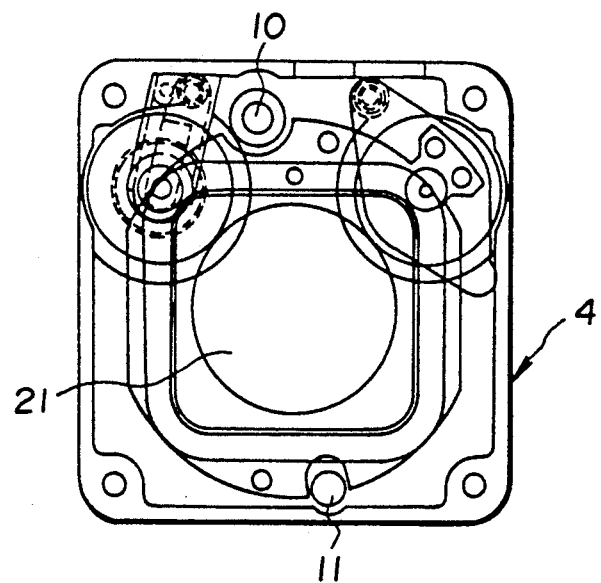
FIG. 8 is a sectional view of the lens barrel, taken along line E—E in FIG. 2.

As illustrated in FIGS. 2 and 8, a filter holder 22 retaining a low-pass filter 21 therein is secured on a front side of the CCD block holder 8 such that the filter 21 is disposed opposite the CCD 7 mounted on the CCD block holder 8. A linear actuator 25 including a yoke 26, a magnet 27 and a coil 28 is mounted on the filter holder 22. An inner surface of an inside wall of the yoke 26 abuts against an outer surface of the filter holder 22. The magnet 27 is fixed onto an inner surface of an outside wall of the yoke 26. The coil 28 is interposed between the magnet 27 and the inside wall of the yoke 26 and projects from a front side of the yoke 26 so as to be fixed to the lens holder ring 15. When the linear actuator 25 is activated, the lens holder ring 15 moves to and fro along the reference shafts 10 and 11 within the rear housing member 4. The master lens group 14 retained by the lens holder ring 15 moves to and fro in the direction of the optical axis C so as to perform autofocusing.

Figure 6:
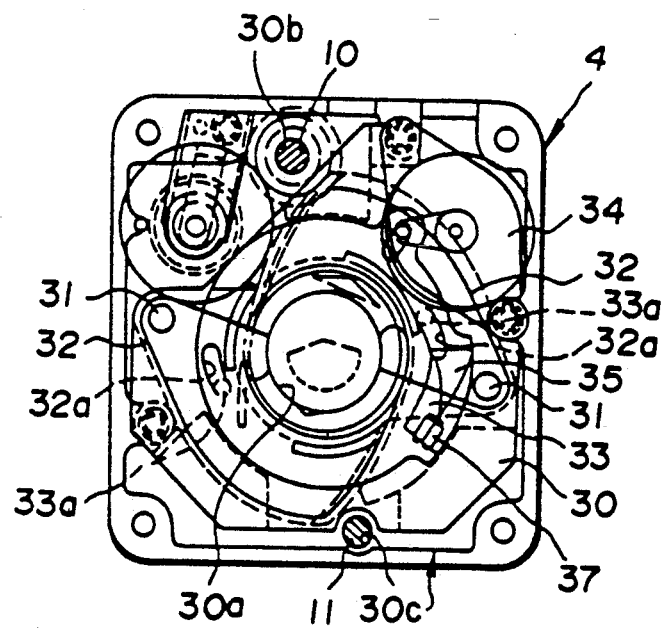
FIG. 6 is a sectional view of the lens barrel, taken along line B—B in FIG. 2.

Referring to FIGS. 2 and 6, the iris block is provided with a square base 30 made of synthetic resin, which is fitted to the opening 2b formed on the rear side of the front housing member 2. The base 30 having a central opening 30a is provided, on a rear side thereof, with diaphragm blades 32, 32 which are pivotally supported on pins 31, 31. Each diaphragm blade 32 has an arcuate hole 32a into which a pin 33a formed on a rotating ring 33 is fitted. The rotating ring 33 is rotatably driven by an actuator 34 so that the blade 32 is pivotally moved around the pins 31, 31 when the pin 33a fitted to the hole 32a urges the blade 32 in a circumferential direction of the rotating ring 33. To this end, the opening 30a is dilated or contracted by pivoting movement of the diaphragm blades 32, 32. In FIG. 6, numerals 30b and 30c represent reference openings for positioning of the iris block 3.

Further a magnet 35 is attached by adhesive or the like to a rear-side outer periphery of the rotating ring 33. The magnet 35 has a magnetic gradient such that an amount of magnetic flux generated from the magnet 35 varies. A Hall element 37 is secured to a cover plate 36 which is disposed on the rear side of the rotating ring 33, such that the magnet 35 and the Hall element 37 are opposite to, and spaced at a given distance apart from, each other. When the rotating ring 33 rotates, magnetic flux generated from the magnet 35 traverses the Hall element 37 so that change in the amount of the magnetic flux is detected by the Hall element 37. On the basis of the detected change, an amount of rotating movement of the diaphragm blades 32 is determined.

As described above, the lens barrel includes reference shafts 10 and 11 to which the first lens holder ring 13 retaining a variator lens group 12 for zooming and second lens holder ring 15 retaining a master lens group 14 for focusing are slidably mounted, respectively. The reference shafts 10 and 11 function not only as a common reference for positioning upon assembling the lens barrel 1, but also a slide guide for reciprocating movement of the lens holder rings 13 and 15. Therefore, as compared with conventional lens barrels, the total number of parts is smaller and the structure thereof is simplified. Thus, the lens barrel 1 may be miniaturized and reduced in weight, resulting in lower manufacturing costs.

Upon assembly, the first lens holder ring 13, the iris block 3, the rear housing member 4 and the second lens holder ring 15 are in turn mounted to the reference shafts 10 and 11 fitted into the grooves 2c and 2d which are formed on the jaw 2a of the front housing member 2. Thus in the assembled lens barrel 1, the lens groups 5, 12, 6 and 14 are automatically disposed at appropriate positions whereby the optical axes of these components of the lens barrel 1 are consistent with each other. Accordingly, there is provided the assembled lens barrel 1 which has high accuracy with low manufacturing cost without danger decentering or dislocation of components even in a case where the components are manufactured to relatively high tolerances.

As is obvious from the aforementioned description of the preferred embodiments according to the invention, the lens barrel of the invention includes first and second reference shafts extending parallel to an optical axis of lens groups mounted with the lens barrel. The lens holder rings are reciprocally mounted to the reference shafts retaining the lens groups for focusing and zooming. The reference shafts function as a common reference for positioning of the lens holder rings. Therefore, the assembly operating is facilitated and an alignment of the lens holder rings is not necessary, resulting in high accuracy and improved efficiency.

Moreover, since the reference shafts function not only as a common reference during assembly, but also a sliding guide for the lens holder rings, the total number of parts of the lens barrel is small. Accordingly, the lens barrel has a simple structure whereby size and weight of the lens barrel are reduced, resulting in considerable miniaturization and cost reduction.

Although the driving power source for moving the first lens holder ring according to the invention is a stepping motor, the driving power source may be a motor of another type.

Further, the reference shafts may alternatively be fixed to the grooves by adhesives rather than press-fitting In case that the reference shafts have length which is too short for stable fixing, a socket and spigot joint may be mounted to each of the shafts between the front housing member and the iris block. Thereby, the reference shafts may be prevented from slanting relative to the optical axis.

Still further, the reference shafts may be elongated to the CCD block holder, so that the CCD block holder is secured to the shafts. To this end, a tolerance (approximate 30–40 μm) in positioning of the CCD is reduced.

In addition, it is noted that the lens barrel of the invention may be further applicable to a still camera.

What is claimed is:

1. A lens barrel of a camera comprising:
    a lens barrel housing including front and rear housing members;
    driving power sources mounted within said lens barrel housing;
    first and second reference shafts supported in said lens barrel housing and extending parallel to an optical axis of the lens barrel; and
    a plurality of lens groups mounted within said lens barrel housing, said lens groups including one group for a first optical characteristic and another group for a second optical characteristic, said lens groups being for zooming and focusing and retained by separate lens holders, said lens holders being mounted to said reference shafts so as to be reciprocally movable along said reference shafts upon activation of said driving power sources.

2. The lens barrel according to claim 1, wherein said first optical characteristic is zooming, and said second optical characteristic is focusing.

3. The lens barrel according to claim 2, wherein an iris control means is disposed between said lens groups for zooming and focusing.

4. The lens barrel according to claim 3, wherein said iris control means has a mechanism for detecting an amount of iris control.

5. The lens barrel according to claim 2, wherein said lens holder having said lens group for zooming is driven by a stepping motor which is one of said driving power sources.

6. The lens barrel according to claim 2, wherein said lens holder having said lens group for focusing is driven by a linear actuator which is one of said driving power sources.

7. The lens barrel according to claim 2, wherein said rear housing member is provided, at a rear side thereof, with a CCD holder on which a charge coupled device is fixedly mounted.

8. A lens barrel of a camera comprising:
    a lens barrel housing including front and rear housing members, said front housing member having a jaw extended inwardly from a front side thereof and said rear housing member having a jaw extended inwardly from a front side thereof;
    driving power sources mounted within said lens barrel housing;
    first and second reference shafts respectively supported in the jaw of said front housing member, respectively extended through openings formed on the jaw of said rear housing member and extending parallel to an optical axis of the lens barrel; and
    a plurality of lens groups mounted within said lens barrel housing, said lens groups including one group for a first optical characteristic and another group for a second optical characteristic, said lens groups being for zooming and focusing and retained by separate lens holders, said lens holders being mounted to said reference shafts so as to be reciprocally movable along said reference shafts upon activation of said driving power sources.

9. The lens barrel according to claim 8, wherein said first optical characteristic is zooming, and said second optical characteristic is focusing.

10. The lens barrel according to claim 9, wherein an iris control means is disposed between said lens groups for zooming and focusing.

11. The lens barrel according to claim 10, wherein said iris control means has a mechanism for detecting an amount of iris control.

12. The lens barrel according to claim 9, wherein said lens holder having said lens group for zooming is driven by a stepping motor which is one of said driving power sources.

13. The lens barrel according to claim 9, wherein said lens holder having said lens group for focusing is driven by a linear actuator which is one of said driving power sources.

14. The lens barrel according to claim 9, wherein said rear housing member is provided, at a rear side thereof, with a CCD holder on which a charge coupled device is fixedly mounted.

* * * * *